(No Model.)
W. O. PELHAM.
RELEASING DEVICE FOR BRAKES OF LOCOMOTIVE DRIVE WHEELS.
No. 529,948. Patented Nov. 27, 1894.
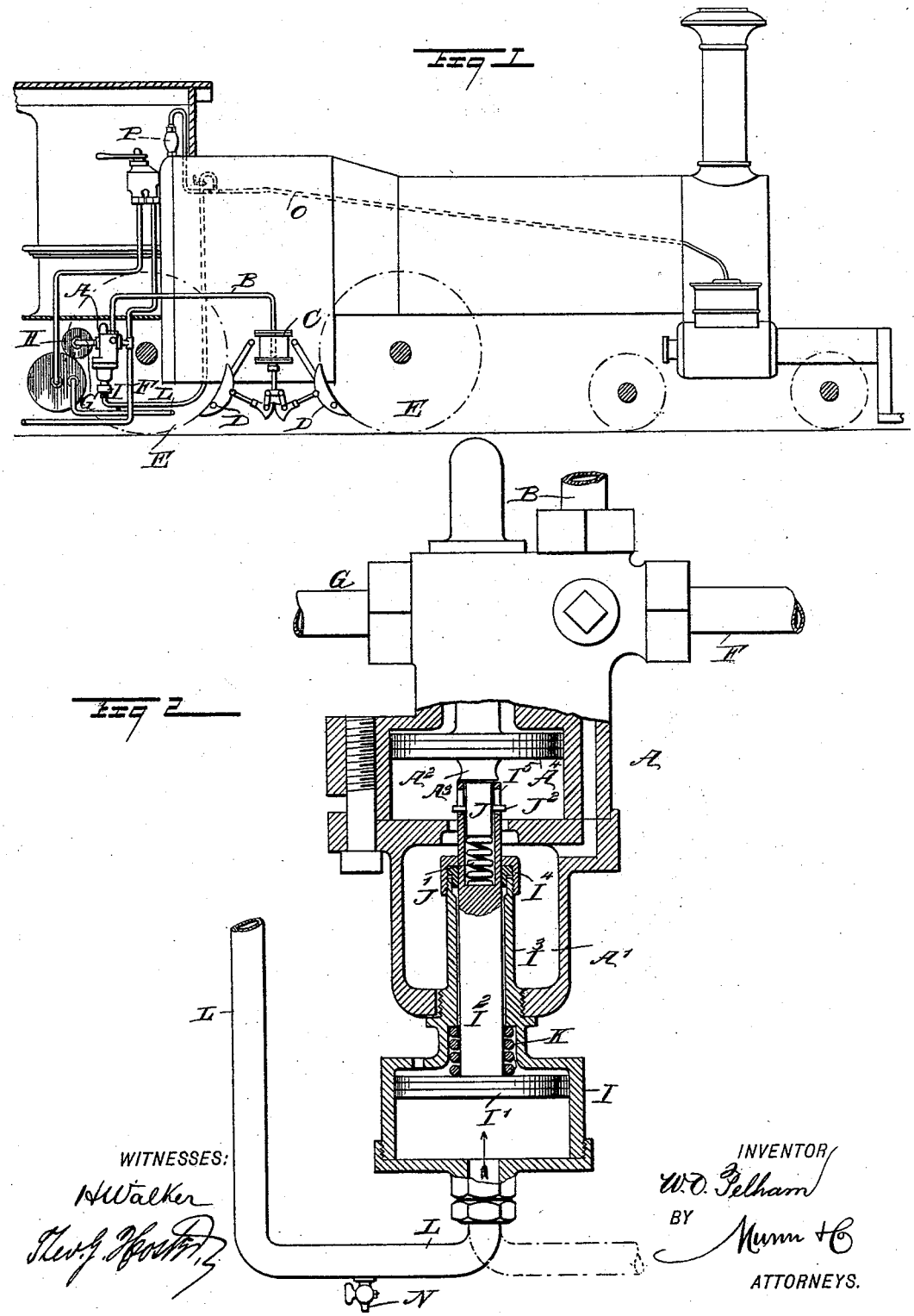

UNITED STATES PATENT OFFICE.

WALTER O. PELHAM, OF TAYLOR, TEXAS, ASSIGNOR OF ONE-HALF TO JOHN W. PARKER, OF SAME PLACE.

RELEASING DEVICE FOR BRAKES OF LOCOMOTIVE DRIVE-WHEELS.

SPECIFICATION forming part of Letters Patent No. 529,948, dated November 27, 1894.

Application filed April 17, 1894. Serial No. 507,833. (No model.)

*To all whom it may concern:*

Be it known that I, WALTER O. PELHAM, of Taylor, in the county of Williamson and State of Texas, have invented a new and Improved Releasing Device for the Brakes of Locomotive Drive-Wheels, of which the following is a full, clear, and exact description.

The invention relates to fluid pressure air brakes, and its object is to provide a new and improved releasing device, which is simple and durable in construction, very effective and automatic in operation, and more especially designed for releasing the brakes on the drive wheels, whenever the engine is reversed and the air brakes are applied, to prevent the drive wheels from being locked and sliding on the track rails, to obviate the uneven wear on the wheel tire.

The invention consists of an auxiliary piston connected with the triple valve piston and controlled by back pressure in the steam chest.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in both the figures.

Figure 1 is a side elevation of the improvement as applied; and Fig. 2 is an enlarged sectional side elevation of the improved triple valve.

The triple valve A, for the locomotive drive wheels is connected by the usual pipe B, with the cylinder C, connected with the brakes D, adapted to brake the drive wheels E, of the locomotive. The triple valve A is also connected with the train pipe F, in the usual manner, and by the pipe G with the auxiliary reservoir H. On the drain cup A' of the triple valve A is secured a cylinder I, containing a piston I' having a piston rod I$^2$, fitted in a staff I$^3$ provided at its upper end with a stuffing box I$^4$, through which extends the upper end of the piston rod I$^2$ to pass through the drain cup A' into the chamber A$^2$, to be acted on at its upper end by the lug A$^3$ of the triple valve piston A$^4$.

In order to ease the contact between the lug A$^3$ and upper end of the piston rod I$^2$ of the auxiliary piston I', I provide the hollow upper end of the piston rod I$^2$ with a plug J pressed on at its under side by a spring J', the movement of the plug being limited by a cross pin J$^2$ engaging slots I$^5$ in the piston rod I$^2$. See Fig. 2.

The top surface of the auxiliary piston I' is pressed on by a spring K to graduate the shock given to the piston I'. The lower end of the cylinder I containing the said piston I' is connected with a pipe L containing in its lower end a small bleed cock N, the said pipe L being connected with the oil supply pipe O leading from the oil reservoir P in the cab of the locomotive to the steam chests of the cylinders to supply the latter with a lubricant.

The operation is as follows: The auxiliary piston I' in its normal position is near the bottom of the cylinder I, so that the triple valve piston A$^4$ acts in the usual manner when the engineer operates the engineer's valve to apply or release the brakes. Now, when the engineer reverses the engine and at the same time applies the brakes, then the back pressure in the steam chests causes a back pressure in the pipe O and consequently in the pipe L, whereby a pressure is exerted in an upward direction on the auxiliary piston I' to force the latter upward into the position shown in Fig. 2. In doing so, the piston rod I$^2$ of the said auxiliary piston I' acts on the triple valve piston A$^4$ to move the latter into a released position, whereby the brakes D are temporarily released from the drive wheels E, to prevent the latter from being locked in place by the back pressure on the cylinders and steam chest and the simultaneous applying of the brakes, as is so frequently the case at present. Now, as soon as the back pressure in the pipe O diminishes, the spring K forces the auxiliary piston I' downward so as to move the piston rod I$^2$ away from the triple valve piston A$^4$, and the latter again can set the brakes in the usual manner. It will be seen that by this arrangement the drive wheel brakes D are instantly released whenever there is back pressure in the cylinders, and a consequent tendency to lock the drive wheels in place, so that they will slide on the track rails, is avoided and consequently the drive wheels will be prevented from sliding on the track rails and uneven wear on their tires is entirely obviated.

It is distinctly understood that by the arrangement described the drive wheel brake release is governed by fluid pressure in the oil pipe, and this fluid pressure is air when the engines are reversed, and steam when there is back pressure in the cylinders and steam chests.

Having thus fully described my invention, I claim as new and desire to secure by Letters Patent—

1. A drive wheel brake mechanism and connections establishing communication between the steam chest oil pipe of the locomotive engine and the triple valve of the said brake mechanism whereby the back pressure in the steam chest will actuate the said triple valve to release the brakes.

2. In a drive wheel brake mechanism, the combination with a triple valve for actuating the brake mechanism of an auxiliary piston connected with the triple valve piston and the steam chest oil pipe connecting the steam chest with the said auxiliary piston to actuate the triple valve for releasing the brake mechanism, substantially as shown and described.

3. An automatic drive wheel brake release provided with an auxiliary piston connected with the triple valve for the drive wheel brake mechanism, and controlled by back pressure in the steam chest of the locomotive.

4. An automatic brake-release, composed of the following parts combined substantially as shown and described; to-wit, the triple-valve piston, an auxiliary cylinder and piston, the latter being arranged for acting mechanically on the triple valve piston, the locomotive steam-chest and oil-supply pipe, and a pipe connecting the latter with the auxiliary cylinder, as specified.

5. The combination with a locomotive steam-chest, triple-valve piston, and brake mechanism, of an auxiliary cylinder connected with the valve, pipes connecting the cylinder and steam-chest, and an auxiliary piston in the cylinder having a stem adapted to act on the triple valve piston, substantially as shown and described.

6. The combination with the locomotive triple-valve piston, the steam-chest, the oil-supply pipe, and brake mechanism, of an auxiliary cylinder, an auxiliary piston arranged in the latter to act on said valve piston, and a spring acting on the auxiliary piston to return it to normal position, and a pipe connecting the auxiliary cylinder and oil-supply pipe, substantially as shown and described.

7. The combination with the locomotive triple-valve piston, the steam-chest and brake mechanism, of the auxiliary cylinder attached to and pendent from the triple valve, a pipe connection between such auxiliary cylinder and steam-chest, the auxiliary piston and its spring arranged in the auxiliary cylinder, a rod projecting from the auxiliary piston, and a spring-supported, slidable plug arranged at the upper end of said rod, for contact with the triple-valve piston, as shown and described.

WALTER O. PELHAM.

Witnesses:
JAMES F. HOGAN,
J. S. JONES.